United States Patent
Keaton

(10) Patent No.: US 6,296,695 B1
(45) Date of Patent: Oct. 2, 2001

(54) METHOD AND MIXTURE FOR CHEMICALLY TINTING GLASS

(76) Inventor: Hiram Keaton, 504 Gaslight La. #24, Bellevue, NE (US) 68005

( * ) Notice: Subject to any disclaimer, the term of this patent is extended or adjusted under 35 U.S.C. 154(b) by 0 days.

(21) Appl. No.: 09/493,395

(22) Filed: Jan. 28, 2000

(51) Int. Cl.⁷ ................ C08J 3/02; C08L 93/00; C03C 17/28
(52) U.S. Cl. .............. 106/237; 106/236; 106/241; 65/60.1; 65/60.3; 427/163.1; 427/165
(58) Field of Search .................... 427/421, 429, 427/163.1, 165; 65/60.1, 60.3; 106/218, 236, 241, 237

(56) References Cited

U.S. PATENT DOCUMENTS

| | | | | |
|---|---|---|---|---|
| 4,138,284 | * | 2/1979 | Postupack | 156/100 |
| 4,963,600 | * | 10/1990 | Coughlin | 523/333 |
| 5,145,760 | * | 9/1992 | Blanchet-Fincher et al. | 430/73 |
| 5,607,726 | * | 3/1997 | Flattery et al. | 427/261 |
| 5,650,263 | * | 7/1997 | Wakata et al. | 430/281.1 |
| 5,698,361 | * | 12/1997 | Aoshima | 430/176 |
| 5,942,368 | * | 8/1999 | Akiyama et al. | 430/176 |

FOREIGN PATENT DOCUMENTS

1507748-A * 9/1989 (EP) .
11302579-A * 11/1999 (JP) .

* cited by examiner

Primary Examiner—Shrive P. Beck
Assistant Examiner—Wesley Markham
(74) Attorney, Agent, or Firm—Zarley, McKee, Thomte, Voorhees & Sease; Dennis L. Thomte

(57) ABSTRACT

The method and formula for tinting glass described herein employs a transparent acetate lacquer. The transparent acetate lacquer is derived from a base of cellulose acetate dissolved in an appropriate solvent. Preferably, additional ingredients are added to the formula to provide a lacquer that is easy to apply and which provides superior adhesion to the glass. The method of this invention includes applying a transparent acetate lacquer to glass and allowing the lacquer to dry. Application of the lacquer may be conducted by any conventional method including spraying and brushing. When dried, the lacquer provides excellent tinting properties.

1 Claim, No Drawings

METHOD AND MIXTURE FOR CHEMICALLY TINTING GLASS

BACKGROUND OF THE INVENTION

The present invention relates to the tinting of glass, primarily of windows, and particularly to a method of tinting glass by the application of a transparent acetate lacquer to the glass.

DESCRIPTION OF THE PRIOR ART

Tinted windows have proven to be desirable for many reasons. They cut glare in interior spaces, save money on air conditioning expenses, and preserve the life of objects which are placed in windows and which would otherwise receive direct sunlight. Furthermore, tinted windows have been used to facilitate privacy and enhance the appearance of buildings and automobiles.

Currently, windows are tinted in one of two ways. Windows may be manufactured with specific elements therein which provide the completed glass with proper tinting. Alternatively, a darkened sheet of film is applied to the glass either at its time of manufacture or when the glass is placed in its end use.

The addition of materials to glass as it is being manufactured is impractical for the purposes of custom tinting of windows. The "after market" tinting of windows must, therefore, be completed by the application of film to the window. The prior art method of tinting windows by an application of film has numerous disadvantages. Generally, the film must be custom cut to fit the window, resulting in wasted film. Furthermore, the film must be applied using special tools that are expensive and not readily available to many consumers. Accordingly, the process of tinting windows has become unnecessarily expensive.

SUMMARY OF THE INVENTION

The method and formula for tinting glass described herein is less expensive and more easily completed than any formula or method disclosed in the prior art. The claimed window tinting formula is a transparent acetate lacquer. The transparent acetate lacquer is derived from a base of cellulose acetate dissolved in an appropriate solvent. Preferably, additional ingredients are added to the formula to provide a lacquer that is easy to apply and which provides superior adhesion to the glass. The method of this invention includes applying a transparent acetate lacquer to a pane of glass and allowing the lacquer to dry. Application of the lacquer may be conducted by any conventional method including spraying and brushing. When dried, the lacquer provides excellent tinting properties.

It is therefore a principal object of the invention to provide a formula for tinting windows that may be applied to the window in liquid form.

It is a further object of the invention to provide a formula for tinting glass that is inexpensive and reduces waste.

Yet another object of the invention is to provide a formula and method for tinting windows which may be applied without the need for special tools.

These and other objects will be apparent to those skilled in the art.

DESCRIPTION OF THE PREFERRED EMBODIMENT

The formula claimed herein is ideally suited to tint windows. The formula may be used in the production of new windows, or may be used for after-market consumer purposes. The formula is a transparent acetate lacquer that adheres to glass. The transparent acetate lacquer may be dyed to provide tinting.

The initial step in producing the formula is dissolving cellulose acetate in an appropriate solvent. Ketones have proven to be excellent solvents for the claimed application, particularly acetone and methyl ethyl ketone. Optimally, the ketone and cellulose acetate are mixed in a ratio of approximately 3:1. Once the ketone and cellulose acetate are completely mixed, a ketone soluble dye may be added to the mixture. The resulting mixture is then suitable for use.

Preferably, before the dye is added, diacetone alcohol, an aromatic alcohol such as benzyl alcohol, an acetate such as ethyl lactate, and trichloroethylene are added to the cellulose acetate and ketone mixture. The additional chemicals enhance the adherence of the formula to the glass. A ketone soluble dye is then added to the mixture. The best dyes for the formula come in a powdered form and should be mixed with a placticizer such as triacetin prior to addition to the formula. One such dye is Solvent Blue 36, an anthraquinone dye sold under the trade name SOLVISOL FAST BLUE CLL. The amount of dye added to the formula will vary.

In the preferred formulation, the cellulose acetate is dissolved in the ketone prior to the addition of the diacetone alcohol, benzyl alcohol, ethyl lactate and trichloroethylene. The ketone soluble dye is mixed with the triacetin separately prior to the addition of the dye and triacetin to the mixture. Preferably, the formula includes, in approximate measure, 22 parts methyl ethyl ketone, seven parts cellulose acetate, 22 parts diacetone alcohol, 17 parts benzyl alcohol, nine parts ethyl lactate, nine parts trichloroethylene, and five parts triacetin. The amount of ketone soluble dye added to the formula will vary upon the strength of the dye, the desired degree of tinting, and other factors to be determined by the end user.

Once the above-listed ingredients are properly mixed, the formula is ready for use. The formula may be applied to glass that is either horizontally or vertically disposed. The glass to which the formula is to be applied may be in production or in its end use, such as in a window, but should be applied to cool glass, as the formula is flammable. Because the formula may be applied to windows that are vertically disposed, the formula is suitable for use on windows, windshields, and the like.

Thus it can be seen that the invention achieves at least all of the stated objectives.

I claim:

1. A chemical formula for surface tinting glass, comprising in approximate measure:

seven parts cellulose acetate;
   twenty-two parts methyl ethyl ketone;
   twenty-two parts diacetone alcohol;
   seventeen parts benzyl alcohol;
   nine parts ethyl lactate;
   nine parts trichloroethylene;
   five parts triacetin; and
   a ketone soluble dye.

* * * * *